US006875945B2

(12) United States Patent
Knauff et al.

(10) Patent No.: US 6,875,945 B2

(45) Date of Patent: Apr. 5, 2005

(54) WELDING TONGS

(75) Inventors: Axel Knauff, Münnerstadt (DE); Holger Schunk, Lendershausen (DE)

(73) Assignee: Siemens Aktiengesellschaft, München (DE)

(*) Notice: Subject to any disclaimer, the term of this patent is extended or adjusted under 35 U.S.C. 154(b) by 127 days.

(21) Appl. No.: 10/350,291

(22) Filed: Jan. 23, 2003

(65) Prior Publication Data

US 2003/0160028 A1 Aug. 28, 2003

(30) Foreign Application Priority Data

Jan. 23, 2002 (DE) ........................................ 102 02 518

(51) Int. Cl.[7] ................................................ B23K 11/11

(52) U.S. Cl. ........................................................ 219/90

(58) Field of Search ................................ 219/90, 86.25, 219/86.33, 86.61, 89

(56) References Cited

U.S. PATENT DOCUMENTS 1,980,228 A * 11/1934 Rogers ........................ 219/90
2,189,784 A * 2/1940 Eckman ....................... 219/90
5,252,801 A * 10/1993 Angel et al. .................. 219/90
5,739,499 A * 4/1998 Suzio et al. .................. 219/90

FOREIGN PATENT DOCUMENTS

| | | |
|---|---|---|
| DE | 2153536 | 5/1973 |
| DE | 4040395 C2 | 6/1994 |
| DE | 19534845 C1 | 10/1996 |
| DE | 19857031 A1 | 6/1999 |
| DE | 19954295 A1 | 5/2000 |
| DE | 19948043 A1 | 4/2001 |
| DE | 19955691 A1 | 6/2001 |
| JP | 1997-248678 | 9/1997 |

* cited by examiner

*Primary Examiner*—Clifford C. Shaw

(74) *Attorney, Agent, or Firm*—Henry M. Feiereisen

(57) ABSTRACT

A pair of welding tongs includes two moveable tong arms, with each tong arm including a first arm element with an electrode, a second arm element, and a connecting element disposed between the first and second arm elements, whereby the connecting elements of the tong arms can rotate about a common fixed reference point. An articulated lever is connected to the second arm element. The pair of welding tongs further includes a mechanical coupling to link the articulated levers of the tong arms, and a drive unit for driving the mechanical coupling. The motion of the mechanical coupling is transmitted to each tong arm of the welding tongs.

13 Claims, 2 Drawing Sheets

14
10
12
11
4
4
3
3
5
5
6
20
30
2
2
1
1
7

1
2
3
4
5
6
7
8
9

WELDING TONGS

CROSS-REFERENCES TO RELATED APPLICATIONS

This application claims the priority of German Patent Application, Ser. No. 102 02 518.5, filed Jan. 23, 2002, pursuant to 35 U.S.C. 119(a)–(d), the disclosure of which is incorporated herein by reference.

BACKGROUND OF THE INVENTION

The present invention relates, in general, to welding tongs, and more particular to welding tongs which can be used for robot-assisted welding of automobile chassis. The present invention further relates to a welding apparatus for operating welding tongs and to the use of welding tongs for a welding robot.

The arms of welding tongs of this type are typically operated by pneumatic and/or hydraulic cylinders. However, welding tongs of this type, driven and/or operated in this way, suffers shortcomings involving, i.a., poor positionability, undesirable elastic behavior and leakage problems.

Japanese Pat. No. JP 1997-248678 describes a drive for welding tongs using a servomotor. However, only one of the two arms of the tongs is moved by the drive.

It would therefore be desirable and advantageous to provide improved welding tongs which obviate prior art shortcomings and have better properties as far as applied force, positionability as well as the forward feed of the material to be welded are concerned.

SUMMARY OF THE INVENTION

According to one aspect of the present invention, a pair of welding tongs includes two tong arms, each tong arm having a first arm element, a second arm element, a connecting element disposed between the first and second arm elements, an articulated lever connected to the second arm element, and an electrode connected to the first arm element, wherein the connecting elements of the first and second tong arms are arranged for rotation about a common fixed reference point; a mechanical coupling for so coupling the articulated levers of the first and second tong arms that a motion of the mechanical coupling is transmitted to each tong arm; and a drive unit for driving the mechanical coupling.

The present invention resolves prior art problems through combining levers and coupling (gear mechanism) to enable a direct control of force and velocity characteristic of the tong arms of the welding tongs. In this way, application-specific processing forces can be produced (e.g., a high closing speed as well as high forces when the tongs are pressed together).

According to another feature of the present invention, the tong arms of the welding tongs can be operated symmetrically. This makes it easier to position the electrodes at the operating point. In addition, greater forces can be generated when the tongs are pressed together.

According to another feature of the present invention, the length of the articulated levers of the first and second tong arms can be varied. In this way, the forces can be readily adjusted when the tongs are pressed together, and the user has many options when selecting a drive.

According to yet another feature of the present invention, the length of the connecting elements can be varied statically and/or dynamically, so that the opening at the operating point can be more easily adjusted. The need for complex modifications can be eliminated by changing the length of the connecting elements dynamically during operation.

According to another feature of the present invention, the coupling can be formed as a planetary gear mechanism. Alternatively, the coupling can be formed as an eccentric gear mechanism. The coupling may also be formed as an eccentric gear mechanism. A useful force/displacement curve can be attained by flexible selection of a suitable drive.

According to still another feature of the present invention, the need for complicated modifications can also be eliminated by constructing the electrodes to be adjustable.

According to yet another feature of the present invention, at least one connecting element can have a length of zero. As a result, the design of the welding tongs can be made more cost-effective.

According to another feature of the present invention, welding tongs according to the present invention can be used in a welding robot. As a result of their flexible design, the welding tongs according to the present are suitable for different types of robots, in particular for robots with point-to-point positioning control or continuous-path control (e.g., for fusion welding).

According to another aspect of the invention, welding tongs according to the present invention can be used in a welding apparatus. A suitable welding apparatus can hereby be designed which utilizes the welding tongs according to the invention effectively in an industrial environment. The welding apparatus may also be used with for various types of welding robots.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
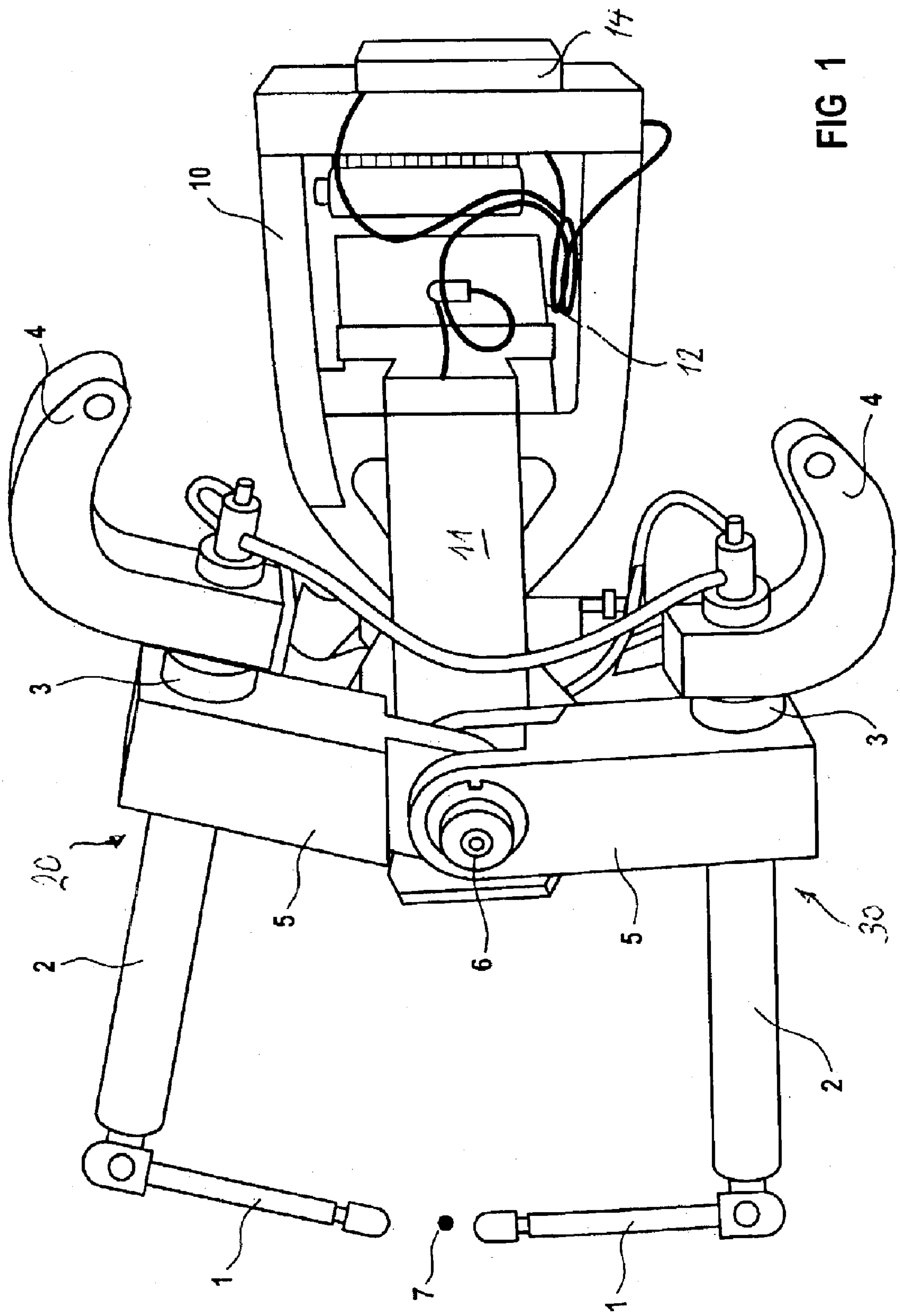
FIG. 1 is a perspective illustration of a pair of welding tongs according to the present invention provided with a mounting.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a perspective illustration of a pair of welding tongs according to the present invention, provided with a mounting 10. The welding tongs include electrodes 1, which make contact at an operating point 7. The electrodes 1 and the corresponding mounting 10 can be constructed so that the electrodes 1 and their position, respectively, can be adjusted, monitored and/or tracked, so as to eliminate the need for complex and expensive modification and to shorten downtimes. The pair of welding tongs includes two tong arms 20, 30, with each of the tong arms 20, 30 including a first arm element 2 and a second arm element 3 which are separated from each other by a connecting element 5. The connecting elements 5 of the tong arms 20, 30 are connected by a hinge for rotation about a fixed reference point 6. In the exemplified illustration of FIG. 1, the mounting 10 is connected with the welding tongs via a bridge 11, which is attached to the connecting element 5 of the tong arm 30 at a level of the reference point 6. The welding tongs can be attached via the mounting 10 to suitable devices or robots (not shown). Suitably, the mounting 10 can be designed to also receive suitable drives and cabling for the welding tongs. Also indicated in FIG. 1 is a controller 12 for controlling the welding tongs, and a connection 14 for providing electric power to the welding tongs.

As further shown in FIG. 1, each of the arm elements 3 of the tong arms 20, 30 is mounted to articulated levers 4. As shown in particular in FIG. 2, the articulated levers 4 can be coupled with each other at their confronting ends by a mechanical coupling 8, which enables each tong arm 20, 30 of the welding tongs to move. The coupling 8 is designed to move the tong arms 20, 30 of the welding tongs in symmetry, which tends to improve the welding process. The coupling 8 may be implemented as a gear mechanism which is operated by a drive, for example, an electric motor. Examples of suitable gear mechanisms include a planetary gear mechanism (spur wheel, bevel gear, screw drive or worm gear), as well as lever-type gear mechanism. These types of gear mechanisms can also be used in combination.

The operating point 7 can be easily changed by varying or adjusting the arm elements (first arm element 2 and second arm element 3), the connecting elements 5 or the articulated levers 4. The position of the operating point 7, for example in a welding line, can thereby be easily adapted to the respective requirements. The adjustments can be manually or dynamically during operation, e.g., by employing electric motors.

Using a combined gear/lever arrangement can provide the following advantages: the ability to directly control the force and velocity characteristic of the tong arms 20, 30 of the welding tongs and to produce process forces adapted to specific applications, e.g., a high closing speed, as well as a large force when the tongs arms 20, 30 are pressed together. Electric drives also enable decentralized control of the welding tongs. The force/displacement characteristic can be adapted to a specific application by suitably combining electrical servo drives with gear mechanism (lever-type gear mechanism or eccentric gear mechanism). The welding tongs according to the invention can be used in particular for welding automobile chassis.

Figure 2:
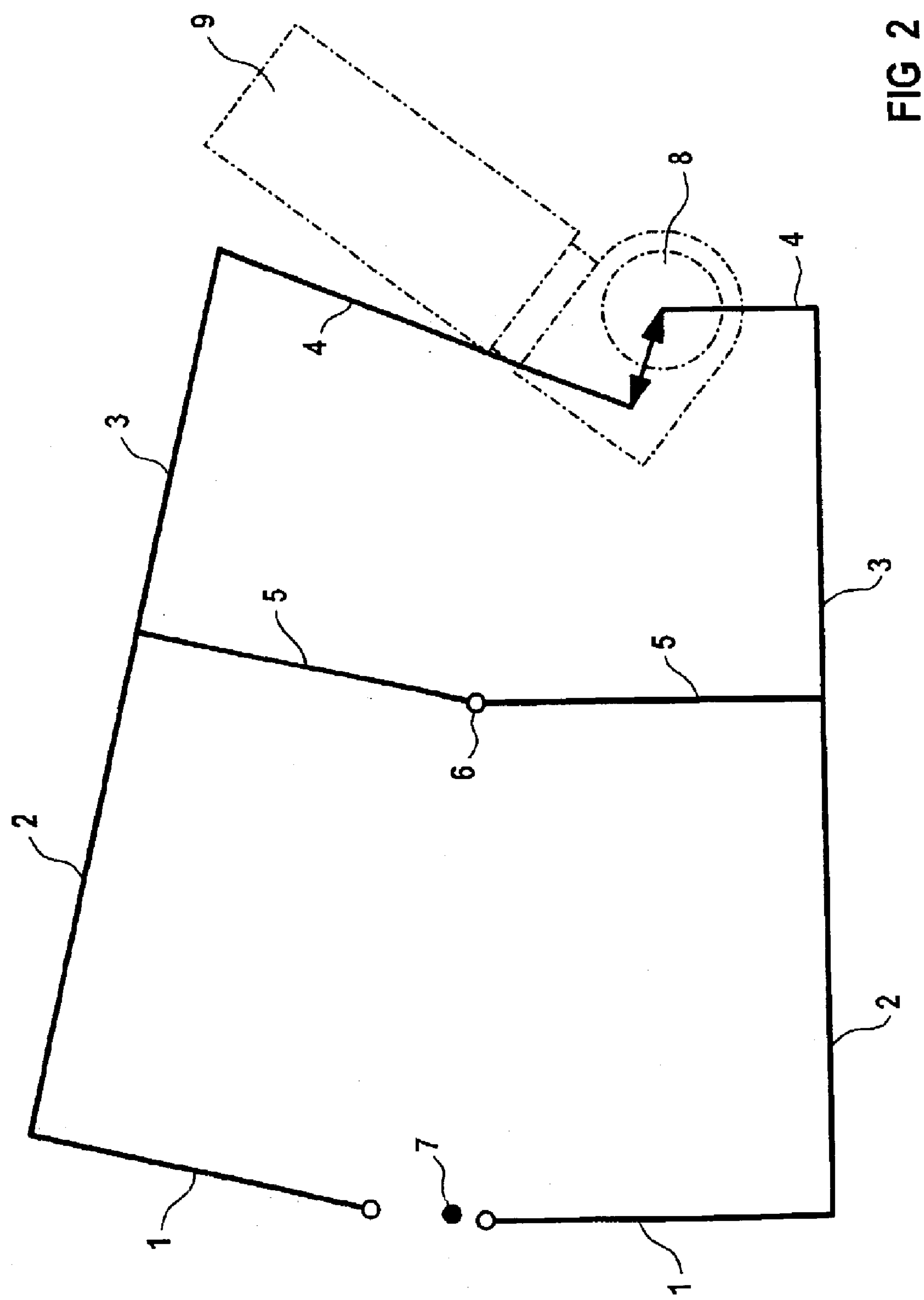
FIG. 2 is a schematic diagram of the welding tongs of FIG. 1 with drive and coupling elements.

FIG. 2 depicts schematically the drive and coupling elements of the welding tongs. Also shown are the electrodes 1, which for welding make contact at the operating point 7. The electrodes 1 are respectively attached to one end of the first arm element 2 of the tong arms 20, 30, whereas the second arm element 3 is connected to the other end of the arm element 2 of the tong arms 20, 30. Disposed at the joint between the first arm element 2 and the second arm element 3 is the connecting element 5, whereby the connecting elements 5 of the tong arms 20, 30 are linked to one another for rotation about the reference point 6. Corresponding articulated levers 4, which are connected with each other via coupling 8, are attached to the second arm element 3. A suitable coupling 8 can be, for example, an eccentric coupling. FIG. 2 also shows schematically an electric motor 9 that drives the coupling 8, i.e. the gear mechanism.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. Welding tongs, comprising two tong arms, each tong arm including a first arm element, a second arm element, a connecting element disposed between the first and second arm elements, an articulated lever connected to the second arm element, and an electrode connected to the first arm element, wherein the connecting element of the first tong arm and the connecting element of the second tong arm are arranged for rotation about a common fixed reference point;

a mechanical coupling for so coupling the articulated levers of the first and second tong arms that a motion of the mechanical coupling is transmitted to each tong arm; and an electric motor coupled directly to the mechanical coupling for driving the mechanical coupling so as to operate the first and second tong arms in symmetry.

2. The welding tongs of claim 1, wherein the articulated levers of the first and second tong arms have an adjustable length.

3. The welding tongs of claim 1, wherein the connecting elements of the first and second tong arms have an adjustable length which is variable statically and/or dynamically.

4. The welding tongs of claim 3, wherein at least one of the connecting elements of the first and second tong arms has a length of zero.

5. The welding tongs of claim 1, wherein the mechanical coupling is implemented as a planetary gear mechanism.

6. The welding tongs of claim 1, wherein the mechanical coupling is implemented as an eccentric gear mechanism.

7. The welding tongs of claim 1, wherein the mechanical coupling is implemented as a lever-type gear mechanism.

8. The welding tongs of claim 1, wherein the electrodes are constructed so as to be adjustable relative to the first arm element.

9. The welding tongs of claim 1 for use in a welding robot.

10. The welding tongs of claim 1, wherein a length of the articulated lever of the first tong arm is different from a length of the articulated lever of the second tong arm.

11. The welding tongs of claim 1, wherein the articulated levers of the first and second tong arms have an adjustable length which is variable statically and/or dynamically.

12. A welding device, comprising:

a pair of welding tongs having two tong arms, each tong arm including a first arm element, a second arm element, a connecting element disposed between the first and second arm elements, an articulated lever connected to the second arm element, and an electrode connected to the first arm element and adjustable relative to the first arm element, wherein the connecting element of the first tong arm and the connecting element of the second tong arm are arranged for rotation about a common fixed reference point, a mechanical coupling for so coupling the articulated levers of the first and second tong arms that a motion of the mechanical coupling is transmitted to each tong arm, and an electric motor coupled directly to mechanical coupling for driving the mechanical coupling so as to operate the first and second tong arms in symmetry; and a mounting for operating the welding tongs, a controller for controlling the welding tongs, and a connection for providing electric power to the welding tongs.

13. The welding device of claim 12 for use in a welding robot.

* * * * *